May 23, 1939.  W. E. SLOAN  2,159,056

VACUUM BREAKER

Filed July 14, 1934

Inventor
William E. Sloan
by Parker & Carter
Attorneys.

Patented May 23, 1939

2,159,056

UNITED STATES PATENT OFFICE 2,159,056

VACUUM BREAKER

William E. Sloan, Chicago, Ill., assignor to Sloan Valve Company, Chicago, Ill., a corporation of Illinois Application July 14, 1934, Serial No. 735,139

2 Claims. (Cl. 277—60)

This invention relates to vacuum breakers and has for its object to provide a new and improved device of this description. The invention has as a further object to provide a vacuum breaker which positively prevents back syphonage from fixtures with submerged inlets or hose sprays when installed on the discharge side of the control valves and above the spill line of the fixture. The invention has as a further object to provide a vacuum breaker particularly adapted for hospital use. The invention has other objejcts which are more particularly pointed out in the accompanying description.

Referring now to the drawing, Fig. 1 is a view showing one form of vacuum breaker;

Fig. 2 is a longitudinal sectional view therethrough;

Fig. 3 is a sectional view taken on line 3—3 of Fig. 2.

Like numerals refer to like parts throughout the several figures.

Referring now to the drawing, there is shown a vacuum breaker comprising a casing 1 having an inlet 2 and an outlet 3. The outlet 3 is provided with a discharge pipe 4 which may discharge liquid into a fixture having a submerged inlet, although it may be used in other connections if desired.

Within the casing is a valve seat 5 surrounding an opening 6 which connects the inlet 2 and the outlet 3. A valve 7 is located in the casing and is adapted to engage the valve seat 5, as shown on the side thereof next the outlet 3. The valve is preferably provided with a seating face 8 of non-metallic material which insures a proper and complete seating at all times. When in use, this valve 7 is arranged in any desired position.

A valve stem 9 is connected with the valve 7 and extends in a direction substantially parallel with the axis of the inlet 2. A guiding member 11 extends across the valve casing and is provided with an opening into which the valve stem 9 is received. The guiding member 11 is preferably provided with a hub 12 to secure a comparatively large contact area with the valve stem.

The valve stem, as herein shown, projects through the valve 7 and is provided with a screw threaded portion 13 upon which is received a nut 14 by means of which the valve is tightly held in position on the valve stem by being forced against the shoulder 15. A coil spring 16 surrounds this end of the valve stem. The valve is provided with a projection 17 which projects into the coil spring, as shown in Fig. 2.

A plug 18 is screw threaded in an opening in the valve casing and is recessed to receive the end of the spring 16. Extending across the valve casing is a wall 19 provided with an opening 20. Extending on one side of the wall 19 is a nipple or hollow tubular member 21 having an internal screw thread. Screw threaded into this tubular member is a member 22 having the hollow portion 23 and the solid portion 24. The solid portion is provided with the two passageways 25 and 26 which connect with the hollow portion 23 and with the recess 27 at the top of the member 22. The solid portion 24 is provided with the central passageway 28 which is connected by a cross passageway 29 with the exterior of the member 22. Within the passageway 28 loosely fits the non-circular stem 30 of the valve member 31 which rests loosely on the seat 32. Connected with the top of the member 22 is a cap 33 which has a projecting flange member 34 which projects across the open ends of the passageway 29, there being a space 35 between the flange 34 and the outer face of the member 22. The member 22 has beyond the end of the flange 34 an outwardly extending annulus 36.

I have described in detail a particular construction embodying the invention, but it is of course evident the parts may be varied in many particulars without departing from the spirit of the invention as embodied in the claims hereto appended, and I therefore do not limit myself to the particular construction shown.

The use and operation of my invention are as follows:

In the use of the device, the inlet pipe is connected with the inlet 2 and the discharge pipe with the outlet 3. When the valve is in operation, the water enters the inlet 2 and moves and opens the valve 7 so as to be discharged from the outlet 3. Any water that may pass through the opening 20 passes up through the passageways 32 and 33 to the recess 27 and to the top of the valve member 31 so as to move it to its closed position and prevent the escape of the water. If there is a back pressure or syphonage action, tending to draw the polluted water up through the outlet 3 and into the supply pipe, this syphoning action draws air from outside of the member 22 into the space 35 and then into the passageway 29 and up through the passageway 28, lifting the valve member 31 and passing said valve member, and then passing down through the passageways 25 and 26 into the chamber 23 and then through the opening 20 and then through the casing and through the outlet 3, thereby breaking the vacuum and preventing the suction action. It will therefore be seen that there is here provided a vacuum breaker which insures the breaking of the vacuum so as to prevent back syphonage and which at the same time prevents the water from passing out of the device so as to be discharged therefrom. When the valve 7 is working properly, it prevents back syphonage. If it fails to work properly, as by becoming worn, or when it is prevented from properly seating or closing, or for other reasons, the vacuum is broken by the construction as above described. It will be seen that this construction gives double protection.

I claim:

1. A vacuum breaker for fixtures having submerged inlets comprising a casing having an inlet and an outlet, a valve seat intermediate the inlet and outlet, a valve engaging said seat, a hollow tubular member connected with said casing, a member having a screw threaded connection with said hollow tubular member and having a hollow portion, a solid portion beyond said hollow portion, a recess in said member, a passageway connecting said hollow portion with said recess, a second passageway in said solid portion extending partway therethrough, a cross passageway connected with said central passageway and extending to the exterior surface of said member, a valve device in said recess having a stem projecting into said second passageway, the stem being of smaller cross sectional area than the passageway, said valve device being normally closed and being held closed by the pressure on the interior of the said member having a screw threaded connection with the hollow tubular member and being opened by atmospheric pressure.

2. A vacuum breaker for preventing back syphonage from fixtures having submerged inlets comprising an inlet and an outlet, a valve seat intermediate the inlet and outlet, a valve engaging said seat, a hollow tubular member connected with said casing, a member having a screw threaded connection with said hollow tubular member and having a hollow portion, a solid portion beyond said hollow portion, a recess in said member, a passageway connecting said hollow portion with said recess, a second passageway in said solid portion extending partway therethrough, a cross passageway connected with said central passageway and extending to the exterior surface of said member, a valve device in said recess having a stem projecting into said second passageway, the stem being of smaller cross sectional area than the passageway, said valve device being normally closed and being held closed by the pressure on the interior of the said member having a screw threaded connection with the hollow tubular member and being opened by atmospheric pressure, and a cap for said member having a projecting flange member separated by a space from said member and projecting past the open ends of said cross passageway.

WILLIAM E. SLOAN.

CERTIFICATE OF CORRECTION.

Patent No. 2,159,056. May 23, 1939.

WILLIAM E. SLOAN.

It is hereby certified that error appears in the printed specification of the above numbered patent requiring correction as follows: Page 2, second column, line 8, claim 2, after "comprising" insert a casing having; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.

uum and preventing the suction action. It will therefore be seen that there is here provided a vacuum breaker which insures the breaking of the vacuum so as to prevent back syphonage and which at the same time prevents the water from passing out of the device so as to be discharged therefrom. When the valve 7 is working properly, it prevents back syphonage. If it fails to work properly, as by becoming worn, or when it is prevented from properly seating or closing, or for other reasons, the vacuum is broken by the construction as above described. It will be seen that this construction gives double protection.

I claim:

1. A vacuum breaker for fixtures having submerged inlets comprising a casing having an inlet and an outlet, a valve seat intermediate the inlet and outlet, a valve engaging said seat, a hollow tubular member connected with said casing, a member having a screw threaded connection with said hollow tubular member and having a hollow portion, a solid portion beyond said hollow portion, a recess in said member, a passageway connecting said hollow portion with said recess, a second passageway in said solid portion extending partway therethrough, a cross passageway connected with said central passageway and extending to the exterior surface of said member, a valve device in said recess having a stem projecting into said second passageway, the stem being of smaller cross sectional area than the passageway, said valve device being normally closed and being held closed by the pressure on the interior of the said member having a screw threaded connection with the hollow tubular member and being opened by atmospheric pressure.

2. A vacuum breaker for preventing back syphonage from fixtures having submerged inlets comprising an inlet and an outlet, a valve seat intermediate the inlet and outlet, a valve engaging said seat, a hollow tubular member connected with said casing, a member having a screw threaded connection with said hollow tubular member and having a hollow portion, a solid portion beyond said hollow portion, a recess in said member, a passageway connecting said hollow portion with said recess, a second passageway in said solid portion extending partway therethrough, a cross passageway connected with said central passageway and extending to the exterior surface of said member, a valve device in said recess having a stem projecting into said second passageway, the stem being of smaller cross sectional area than the passageway, said valve device being normally closed and being held closed by the pressure on the interior of the said member having a screw threaded connection with the hollow tubular member and being opened by atmospheric pressure, and a cap for said member having a projecting flange member separated by a space from said member and projecting past the open ends of said cross passageway.

WILLIAM E. SLOAN.

CERTIFICATE OF CORRECTION.

Patent No. 2,159,056. May 23, 1939.

WILLIAM E. SLOAN.

It is hereby certified that error appears in the printed specification of the above numbered patent requiring correction as follows: Page 2, second column, line 8, claim 2, after "comprising" insert a casing having; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.